(12) United States Patent
Monnin et al.

(10) Patent No.: US 11,668,407 B2
(45) Date of Patent: Jun. 6, 2023

(54) MOTORISED BALL VALVE

(71) Applicant: MMT AG, Zug (CH)

(72) Inventors: Jonas Monnin, Fa Ferrière (CH); Daniel Sigg, Sonceboz-Sombeval (CH)

(73) Assignee: MMT AG, Zug (CH)

( * ) Notice: Subject to any disclaimer, the term of this patent is extended or adjusted under 35 U.S.C. 154(b) by 0 days.

(21) Appl. No.: 16/483,698

(22) PCT Filed: Dec. 22, 2017

(86) PCT No.: PCT/EP2017/084386
§ 371 (c)(1),
(2) Date: Aug. 5, 2019

(87) PCT Pub. No.: WO2018/141468
PCT Pub. Date: Aug. 9, 2018

(65) Prior Publication Data
US 2020/0025306 A1 Jan. 23, 2020

(30) Foreign Application Priority Data
Feb. 6, 2017 (FR) ...................................... 1750974

(51) Int. Cl.
*F16K 31/04* (2006.01)
*F16K 5/06* (2006.01)
*F16K 27/06* (2006.01)

(52) U.S. Cl.
CPC .......... *F16K 31/043* (2013.01); *F16K 5/0605* (2013.01); *F16K 27/067* (2013.01)

(58) Field of Classification Search
CPC ..... F16K 31/043; F16K 31/535; F16K 5/0605
See application file for complete search history.

(56) References Cited

U.S. PATENT DOCUMENTS

| 5,356,112 A * | 10/1994 | Simar ................... F16K 31/043 |
| | | 251/129.11 |
| 6,257,271 B1 | 7/2001 | Babin et al. |
| 7,304,450 B2 | 12/2007 | Prudham |
| 7,432,682 B2 | 10/2008 | Rondot et al. |
| 7,589,445 B2 | 9/2009 | Gandel et al. |
| 7,898,122 B2 | 3/2011 | Andrieux et al. |

(Continued)

FOREIGN PATENT DOCUMENTS

| EP | 0397058 A2 | 11/1990 |
| JP | 19950208628 | 8/1995 |
| JP | 2003156105 A | 5/2003 |

*Primary Examiner* — Reinaldo Sanchez-Medina
*Assistant Examiner* — Nicole Gardner
(74) *Attorney, Agent, or Firm* — Harness Dickey & Pierce, PLC

(57) ABSTRACT

A motorized valve includes a body with at least one intake duct and one outlet duct, a plugging member movably mounted in the body to plug or release a passage between the intake duct and the outlet duct, and a motorized control system for controlling the movement of the plugging member. The motorized control system also includes a plug valve connecting intake and outlet ducts, a gear motor including an electric motor and a reduction gear train. The gear train includes an exit wheel rotating the plug of the valve so as to allow progressive opening of the valve, and the gear motor is formed by a casing including the electric motor and reduction gear train, the valve body being integrally formed with the casing.

20 Claims, 4 Drawing Sheets

(56) References Cited

U.S. PATENT DOCUMENTS

| | | | |
|---|---|---|---|
| 8,171,957 B2* | 5/2012 | Toral Gomez | F16K 31/535 |
| | | | 137/625.11 |
| 9,185,856 B1* | 11/2015 | Barcatta | F16K 31/041 |
| 9,441,741 B2 | 9/2016 | Le Pellec | |
| 9,684,285 B2 | 6/2017 | Rondot et al. | |
| 10,122,311 B2 | 11/2018 | Andrieux et al. | |
| 2001/0035510 A1 | 11/2001 | Oh | |
| 2014/0373555 A1 | 12/2014 | Beier et al. | |
| 2015/0300298 A1* | 10/2015 | Mellere | F02M 26/70 |
| | | | 251/129.11 |
| 2016/0102775 A1* | 4/2016 | Shakkour | F16K 31/043 |
| | | | 251/129.12 |
| 2017/0194885 A1 | 7/2017 | Rondot et al. | |
| 2017/0331409 A1 | 11/2017 | Andrieux et al. | |
| 2017/0338726 A1 | 11/2017 | Gandel et al. | |
| 2017/0370493 A1 | 12/2017 | Sigg et al. | |
| 2017/0373555 A1* | 12/2017 | Sigg | H02K 5/203 |
| 2018/0219435 A1 | 8/2018 | Billet et al. | |
| 2019/0188261 A1 | 6/2019 | Herzig et al. | |
| 2019/0229587 A1 | 7/2019 | Watrin et al. | |

* cited by examiner

MOTORISED BALL VALVE

CROSS-REFERENCE TO RELATED APPLICATIONS

This application is a National Phase entry of International Application No. PCT/EP2017/084386, filed on Dec. 22, 2017 which claims priority to French Application No. 1750974 filed on Feb. 6, 2017, both of which are incorporated by reference herein.

TECHNICAL FIELD

The invention relates to the field of motorised valves comprising a body with at least one inlet and one outlet, a plugging member movably mounted in the body to plug or release a passage between the inlet and outlet, and an actuator to control the movement of the plugging member. According to a particular, but not limited, application, the invention relates to the management of motor vehicle fuel vapours and more particularly a purge valve for these vapours. The tank fuel vapour recycling system includes a fuel vapour absorber and a fuel vapour absorber purge valve. The fuel vapor absorber receives the vapours from the tank under the pressure of the vapours and recovers and stores them from activated carbon granules until the power train control module determines when the vapours can be consumed in the normal combustion process.

In general, the tank fuel vapour recycling system includes a fuel vapour absorber, a fuel vapour absorber purge valve, a fuel vapour absorber ventilation valve, a hood valve and a fuel tank pressure sensor, a sealed tank cap, a fuel vapour emission service port and the power train control module. The fuel vapor absorber purge valve allows the flow of vapours from the fuel vapor absorber to the intake manifold. This normally closed valve is controlled by pulse width modulation (PWM) under the control of the power train control module to accurately control the flow of fuel vapours to the combustion chambers. The valve is also open during the diagnostic test, allowing the engine vacuum to exert its vacuum in the fuel vapour recycling system.

When degassing the vapours of the fuel vapor absorber, the power train control unit controls the opening of the fuel vapor absorber purge valve, allowing the engine vacuum to be applied to the fuel vapor absorber. The fuel vapour absorber ventilation valve, normally open, allows fresh air to be drawn into the fuel vapour absorber which, by circulating through the activated carbon granules, extracts the hydrocarbons to the intake manifold for consumption during normal combustion.

BACKGROUND

Motorized valves using plug valves are known to be state-of-the-art, as described in U.S. Pat. No. 9,441,741 and JP 1995208628 and JP 2003156105. These solutions never present the integration of the plug valve with the duct to be plugged. This results in assemblies requiring numerous sealing gaskets and a large space requirement for the junction of the valve with the actuator.

In state-of-the-art solutions for purging the fuel vapour absorber, the valve constituting the fuel vapour absorber purge valve and allowing the flow or not of vapours from the fuel vapour absorber to the intake manifold is normally closed and controlled by a solenoid type actuator (variable reluctance actuator without magnet) controlled by an MLI control unit under the power train control module to accurately control the flow of fuel vapours to the combustion chambers. The valve is also open during the diagnostic test, allowing the engine vacuum to exert its vacuum in the fuel vapour recycling system.

More precisely, a monostable solenoid (or electromagnet) actuator makes it possible to move a moving element in two positions: a current-free position held by a spring and another position obtained when the solenoid is powered to move the moving element. A needle then attached to the moving part closes the fluid passage channel when it is in contact with the needle receptacle. This channel is then opened when the solenoid is controlled, allowing the fluid to pass freely. In order to vary the average degree of opening of the valve, the actuator is continuously open and closed with variable closed and open times at a frequency of about 10 Hz. The advantages of this type of solenoid actuator are multiple: low cost, simple control (simple PWM), low response time between open and closed state (equal to the control frequency), good compactness due to the simple design.

European patent EP0397058 describes an example of a solenoid valve with a valve seat arranged between an inlet port and an outlet port with a solenoid actuator. The current valves, powered by electromagnets, have several drawbacks resulting from their design:
- sensitivity to particles from the activated carbon tank (implying a risk of leakage if particles are present between the needle and the seal),
- clogging of the filter leading to a reduction in the flow rate that can pass through the valve,
- memory effects on the seals (the valve is normally in the closed position, the contact force between the needle and the seal can cause the seal to creep, which can cause a leak),
- noise (the control frequency of the solenoid is about 10 Hz, which generates a fairly high audible click noise),
- gluing effect (with the valve being normally in the closed position, it is possible that the needle will stick to the seal after a long period of inactivity),
- limited flow (the design of this type of valve does not allow a large opening diameter without the risk of slight leaks if the size of the solenoid is not significantly increased),
- no direct diagnosis possible (market valves have two unique electrical connections to operate the solenoid moving needle, system failure—damaged winding, glued needle, etc.)—cannot be detected directly),
- power consumption (knowing that the valve opening percentage is regulated using an PWM, the actuator continuously consumes power between 1 and 99% of opening).

In addition, the development of new engines using variable valve lift results in a decrease in the natural vacuum of the engine used here to suck gasoline vapours through the control valve. This has the effect of increasing the passage diameter of the valve in order to guarantee a sufficient mass flow despite a lower pressure difference and to guarantee a sufficient valve opening resolution despite a lower pressure difference.

SUMMARY

This invention aims to overcome the disadvantages of the current state of the art by improving in particular the compactness of the plug valves of the prior art and the number of gaskets necessary for sealing. This invention also aims to allow the construction of a fuel absorber tank purge valve in the form of a progressive opening valve, of the plug type, controlled by a gear motor. This invention aims in particular to provide solutions in terms of:

- minimized power consumption, the valve is only controlled (and therefore consumes power) when a movement is desired,
- minimized noise, as the valve only moves during the positioning phase, it does not generate any permanent noise pollution,
- modulation of the opening flow rate, with the possibility of obtaining a large gas flow cross-section without impacting the overall design of the motorised valve,
- self-cleaning function, the specific configuration of the plug valve allows to scrape the particles of the carbon filter from the tank during the movement of the valve,
- diagnostic function thanks to the integration of a position sensor that can give very accurate information on the opening position of the plug valve.

One of the purposes of the invention is also to propose a
- simplified construction, particularly in terms of the number of sealing gaskets required, thanks to the use of a valve casing forming, in a single piece, at least one intake or outlet duct.

More particularly, the invention in its broadest sense, relates to a motorised valve having a body with at least one intake duct and an outlet duct, a plugging member mounted so as to be movable in the body to plug or release a passage between said intake duct and said outlet duct, and a motorised control system for controlling the movement of the plugging member, said motorised control system comprising a plug valve connecting said intake and outlet ducts, a gear motor comprising an electric motor and a reduction gear train, said gear train comprising an exit wheel rotating the plug of said valve to allow progressive opening of the valve characterised in that said gear motor is formed of a casing comprising said electric motor and reduction gear train, the valve body being formed integrally with the casing.

According to alternative solutions:
- at least one of said intake or outlet ducts is integrally formed with said casing.
- said exit wheel is extended by a shaft directly in mechanical connection with said plug.
- said exit wheel is integral with a sensor magnet, a magneto-sensitive probe 18 being positioned in the vicinity of said sensor magnet.
- the exit wheel is formed integrally with the plug.
- said casing is formed by injection of a plastic material and [in that] the electric motor comprises a stator overmoulded by said plastic material.
- the casing forms a first casing for positioning a printed circuit board receiving control electronics for said motor and a second casing for positioning the gears of said reduction train and [in that] the rotor of the electric motor is housed in the second housing and separated from the stator by an overmoulding skin or a wall.

The invention also relates to the application of such an integrated motorised valve, as a valve, to the purge circuit of the fuel vapor absorber. The invention also relates to a motorised valve comprising a body with at least one intake and one outlet pipe, a plugging member in the form of a plug movably mounted in the body to plug or release a passage between said intake and said outlet pipe, and a motorised control system to control the movement of the plug, said motorised control system comprising a gear motor comprising an electric motor and a reduction gear train, said gear train comprising an exit wheel rotating the plug of said valve so as to allow progressive opening of the valve, characterised in that the valve is integrated, as a valve, into the purging circuit of the fuel vapor absorber.

BRIEF DESCRIPTION OF THE DRAWINGS

Other characteristics and advantages of the invention will appear in the description that follows relative to detailed embodiments, and referring to the attached figures that represent respectively:

FIG. 7b, an exploded view of the valve shown in FIG. 7a.

DETAILED DESCRIPTION

Figure 1:
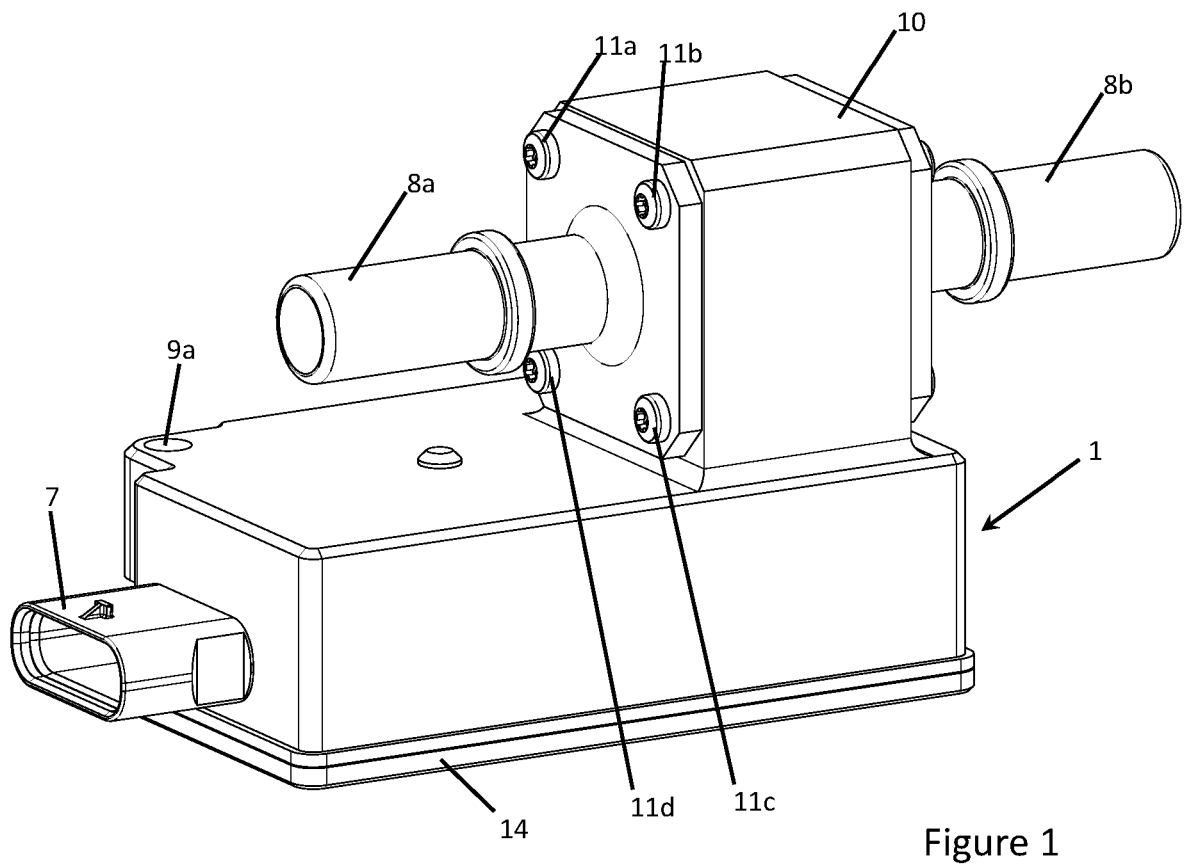
FIG. 1 is a perspective view of a first exemplary embodiment of a valve according to the invention.

In FIG. 1, the motorised fuel vapor absorber purge valve is formed by a casing 1, forming in one piece, the valve body 10 on which two intake 8a and outlet 8b ducts are attached. The casing 1 is also extended by a connector 7 for the power supply of the motorised valve. In this example, the intake 8a and outlet 8b ducts are attached to the valve body 10 using screws 11a to 11d. The casing 1 is closed by a glued or welded cover 14 and has means for attaching to an external reception structure (not shown) in the form of holes 9a, 9b visible in FIG. 3.

Figure 2:
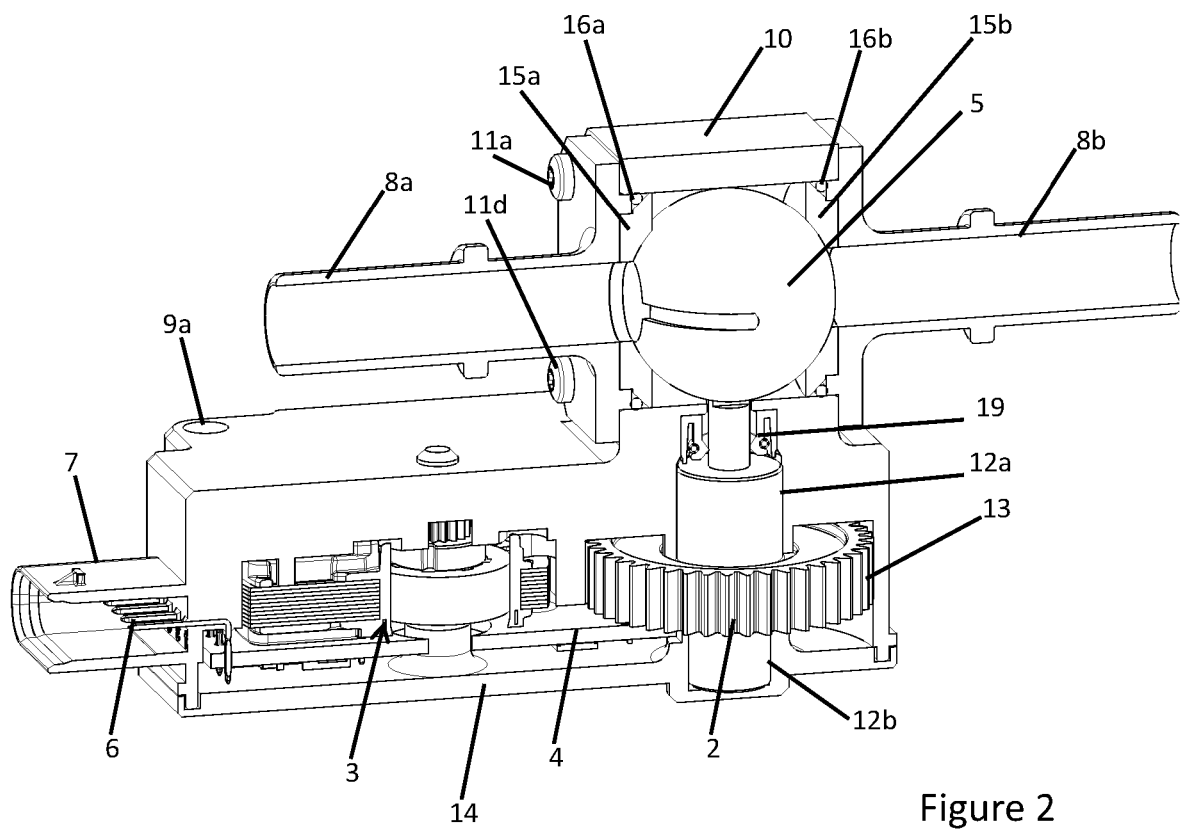
FIG. 2, a longitudinally cut perspective view of the first exemplary embodiment of a valve according to the invention.

As shown in FIG. 2, inside the casing 1 are the reduction gear train 2, the electric motor 3, a printed circuit board 4 for receiving control electronics and a plug valve 5. The casing 1 overmoulds the electrical connection tracks 6 of the motorised valve to form the connector 7. The casing 1 also forms in one piece the valve body 10 of the intake 8a and outlet 8b ducts, as well as the holes 9a, 9b for fastening the motorised valve to its support.

The casing 1 forms a first through bearing 12a, allowing the exit wheel 13 of the gear train 2 to mechanically drive the plug (5). This first bearing 12a is also extended by a lip seal 19 making it possible to isolate the electric motor 3 and the printed circuit board 4 from petrol vapours. A second bearing 12b of the exit wheel 13 is formed by a cover 14 which is rigidly connected to the casing 1 in order to seal it.

The plug valve formed by the upper part of the casing 1 contains in its center the spherical plug 5 held on either side by the plug seats 15a, 15b, the preload and sealing of which are ensured by two O-rings 16a, 16b in contact with the intake duct 8*a* on one side and the outlet duct 8*b* on the other side. Said ducts are rigidly connected to the casing 1 using self-tapping screws 11*a* to 11*d*. This first embodiment therefore includes three joints 19, 16*a* and 16*b* but it is possible, still within the scope of the invention, to propose embodiments that have two joints, or even only one joint as described below.

Figure 3:
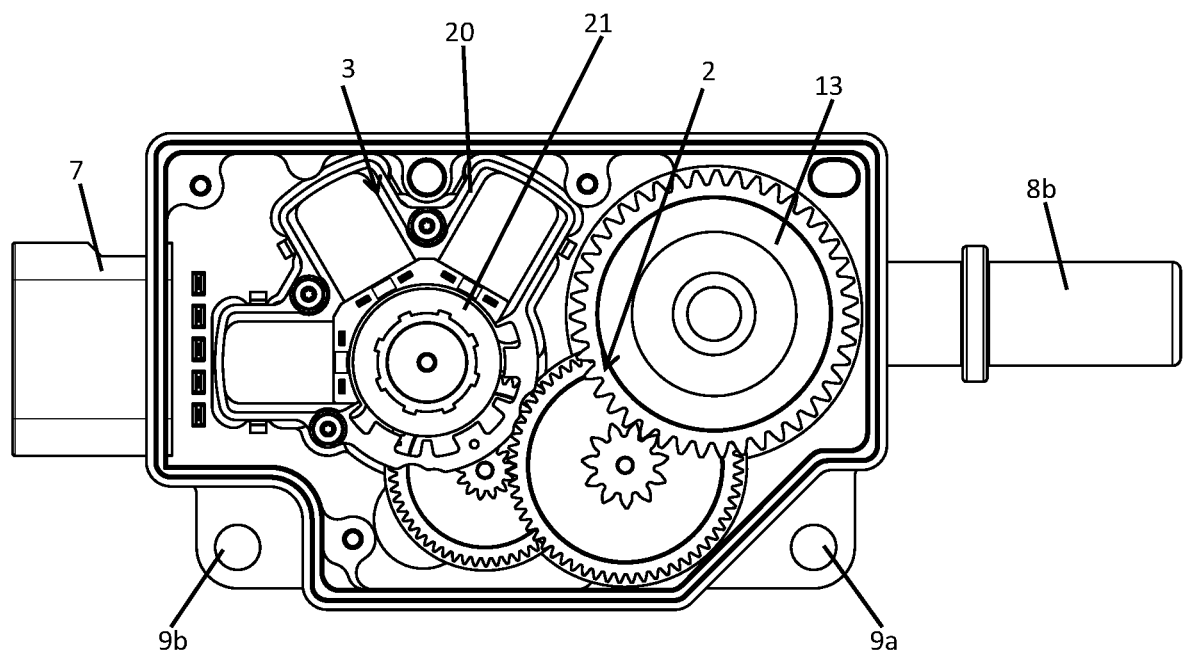
FIG. 3, a top view of the first exemplary embodiment of a valve according to the invention, with the cover being removed.

FIG. 3 shows a top view without cover of the motorised valve that allows a better appreciation of the presence of the electric motor 3, formed by a stator 20 and a rotor 21 associated with a reduction gear train 2, here formed by three spur gear stages, although this choice is not restrictive for this invention. The last wheel is the exit wheel 13 which drives the plug 5 not visible in this figure.

Figure 4:
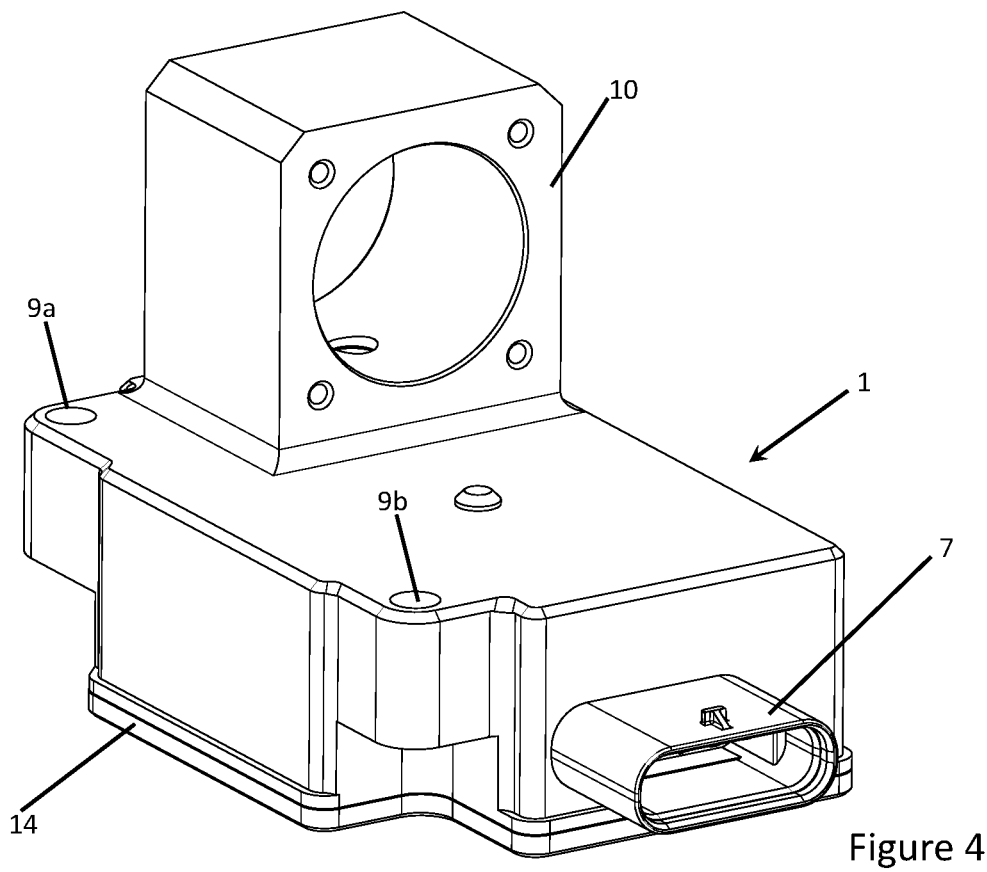
FIG. 4, an isolated perspective view of the casing of the first exemplary embodiment of a valve according to the invention.

FIG. 4 shows the insulated box or casing 1. The valve body 10 is an integral part of the casing 1, i.e. it forms a single part, and the assembly can, for example, be made by injection of a plastic material. In this version, which is the one used in the first embodiment, the intake 8*a* and outlet 8*b* ducts are attached on the valve body 10, but it can be considered to form, with the casing 1 and the valve body 10, one of said ducts 8*a*, 8*b* or even both ducts 8*a*, 8*b*, as shown below.

Figure 5:
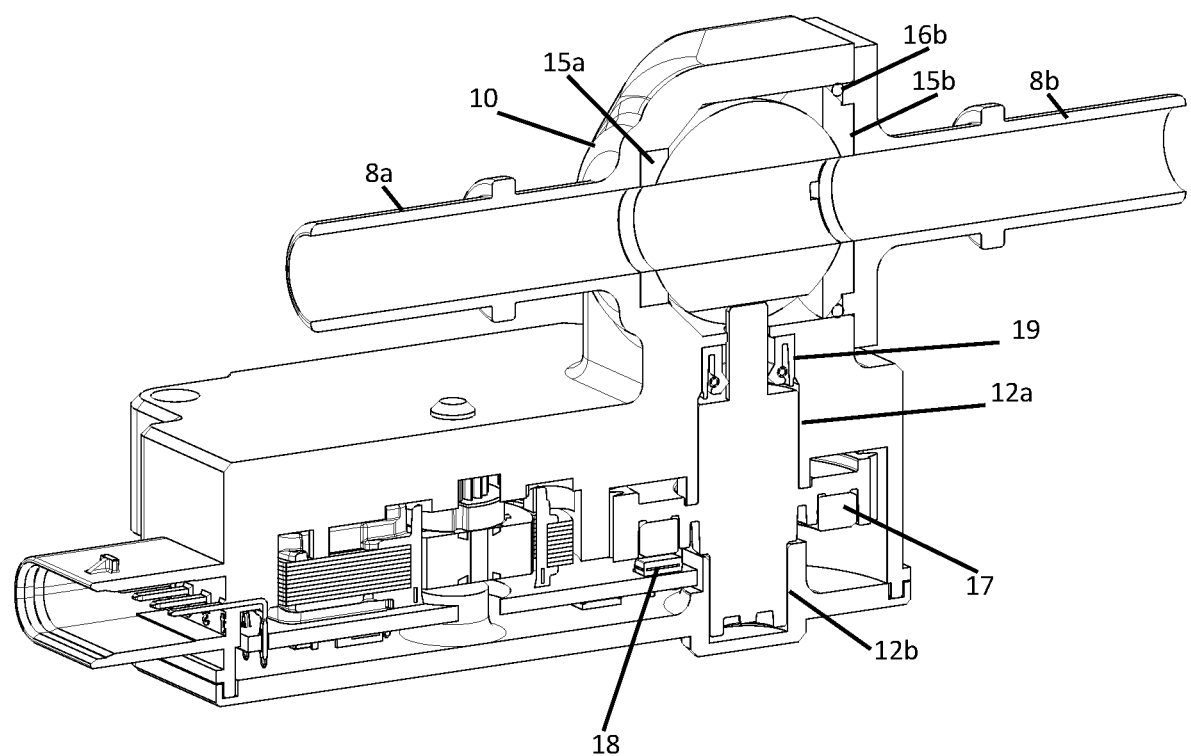
FIG. 5, a longitudinally cut perspective view of a second exemplary embodiment of the valve according to the invention where one of the intake or outlet ducts is formed by the gear motor casing.

FIG. 5 shows a second exemplary embodiment, where one of the ducts, here the intake duct 8*a*, is an integral part of the casing 1, i.e. it is formed with the casing 1, for example by injection of a plastic material. This advantageous embodiment reduces the number of parts, eliminates a sealing gasket and a step of fixing the duct 8*a* to the casing 1 and eliminates attaching elements. Thus, there are only two seals used 19, 16*b*. In this example, the exit wheel 13 is fixed to a through sensor magnet 17, allowing a magneto-sensitive probe 18 placed on the printed circuit 4 to know its precise position and to avoid positioning errors of the gear train 2 and the electric motor 3.

Figure 6:
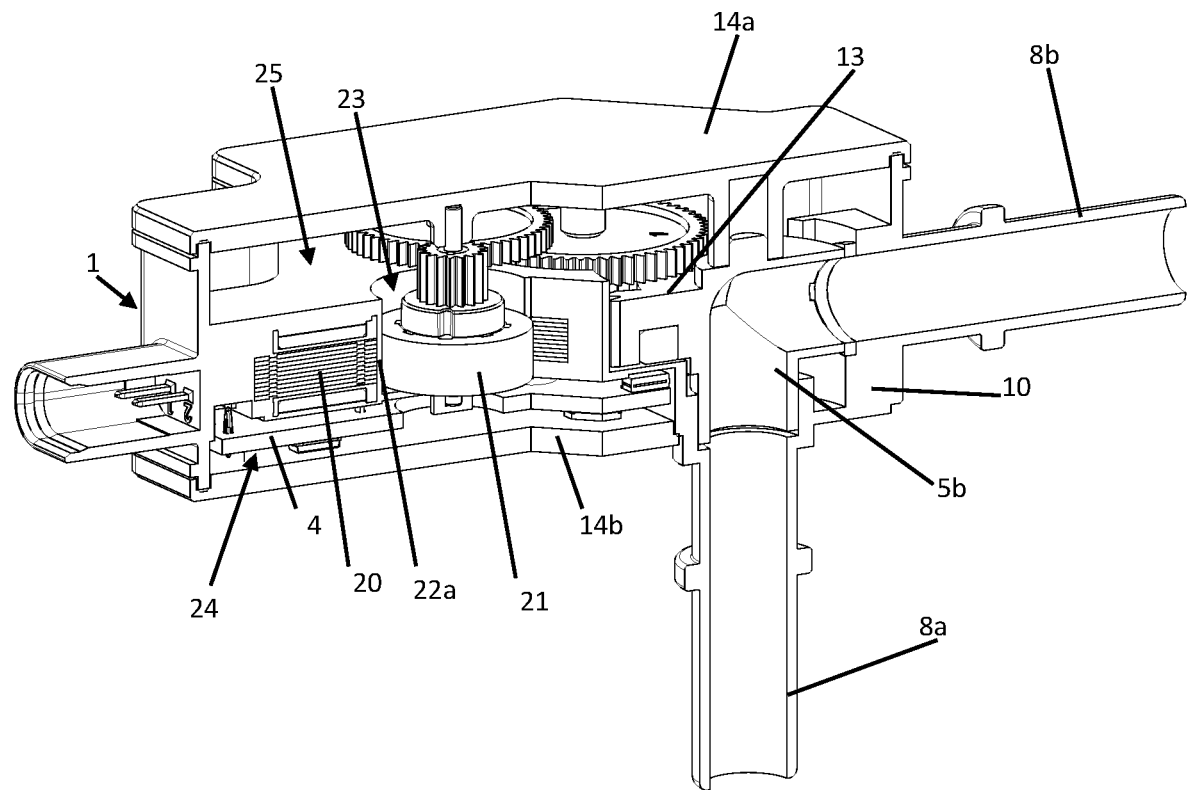
FIG. 6, a longitudinally cut perspective view of a third exemplary embodiment of the valve according to the invention where both intake and outlet ducts are formed by the gear motor casing.

FIG. 6 shows an alternative solution that eliminates the sealing gasket 19 of the exit wheel 13 and other static seals. Indeed, in this embodiment, elements sensitive to petrol vapours, such as the stator 20 of the electric motor and the printed circuit board 4 which carries the control electronics, are not in contact with the petrol vapours. This is possible by insulating the stator 20 from the rotor 21, either by overmoulding the stator 20, which is separated from the rotor 21 by an overmoulding skin 22*a*—as shown in FIG. 6—or by positioning the stator 20 in a cavity 23, whereby the stator 20 is separated from the rotor 21 by a thin wall 22*b*—as shown in FIG. 7*a*.

In this example, the plug 5*b* is cylindrical and the intake 8*a* and outlet 8*b* ducts are formed with the casing 1. Advantageously, the plug 5*b* is an integral part of the exit wheel 13, the plug 5*b* and the exit wheel 13 forming a single piece. Eliminating the seal on the exit wheel 13 advantageously limits the friction torques to be overcome by the motor and thus minimizes power consumption, or even sizing a motor with a smaller footprint.

Figure 7A:
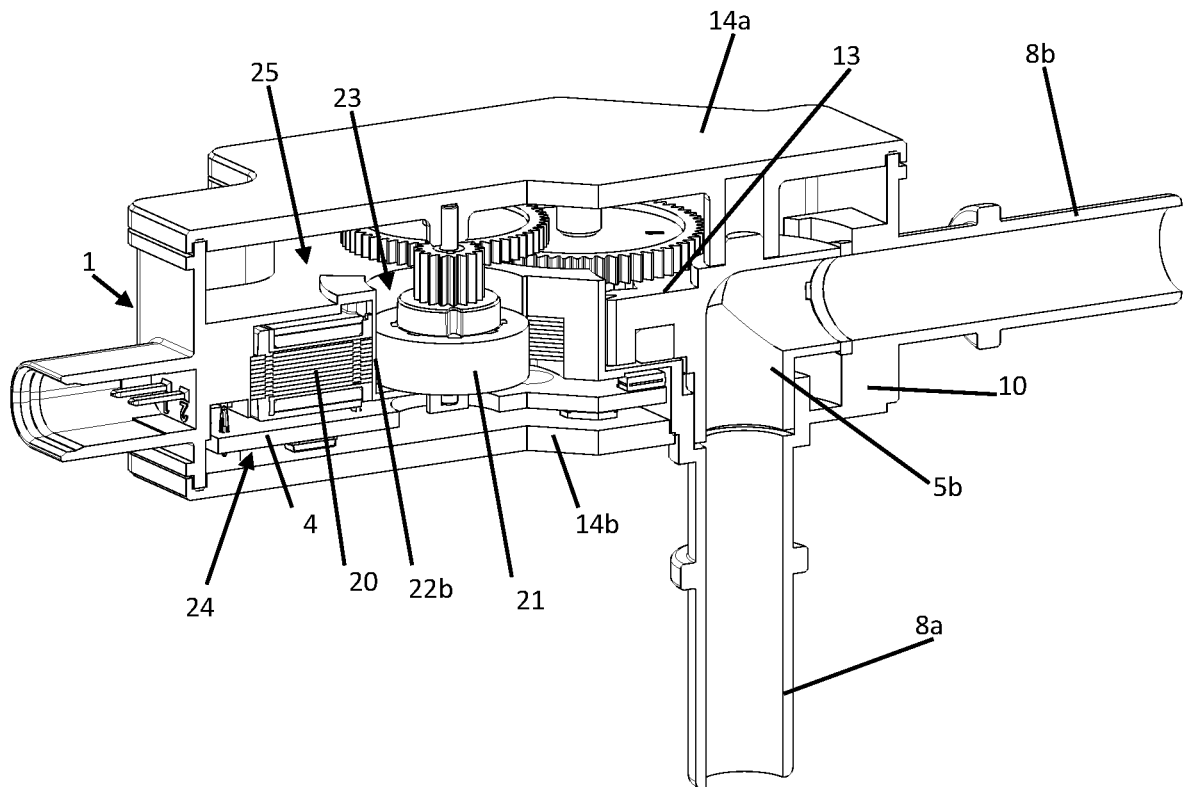
FIG. 7a, a longitudinally cut perspective view of a fourth exemplary embodiment of the valve according to the invention where the two intake and outlet ducts are formed by the gear motor casing.
Figure 7B:
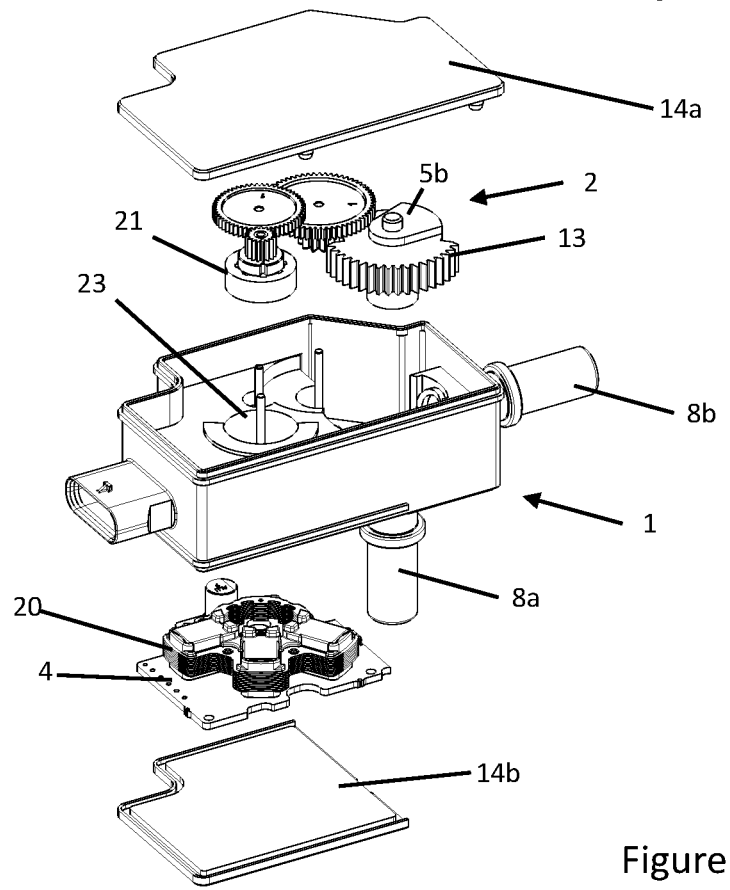

The embodiments of FIGS. 6 and 7*a* show, on either side of the casing (1), housings 24, 25. The first housing 24 is used to install the printed circuit board 4 above the stator 20, whether it is overmoulded with the casing 1 as shown in FIG. 6 or placed in the casing 1 as shown in FIGS. 7*a* and 7*b*. The second housing 25 is used to install the reduction gear train 2. The housings 24, 25 are closed by covers, respectively 14*b*, 14*a*, which are glued or welded to the casing 1.

The invention claimed is:

1. A motorised valve comprising:
   a body with at least one intake duct and one outlet duct;
   a plug movably mounted in the body to plug or release a passage between the intake duct and the outlet duct; and
   a motorised control system operably controlling movement of the plug, the motorised control system comprising a gear motor comprising an electric motor and a reduction gear train, the reduction gear train comprising one or more gears and an exit wheel, the exit wheel configured to rotate the plug of the valve so as to allow progressive opening of the valve, the electric motor having a motor rotational axis, the exit wheel having an exit wheel rotational axis, and each of the one or more gears having a gear rotational axis, the exit wheel rotational axis and each gear rotational axis parallel to the motor rotational axis;
   the gear motor being a casing comprising the electric motor and the reduction gear train, the body being integrally formed with the casing without a mounting brace therebetween;
   the casing defining an inner space therein, said inner space having the electric motor and the reduction gear train disposed therein, wherein the electric motor and exit wheel are located in the inner space along a plane which runs perpendicular to the exit wheel rotational axis.

2. A motorised valve according to claim 1, further comprising a sensor or magnet, the exit wheel being integral with the sensor or magnet, and a magneto-sensitive probe being positioned in a vicinity of the sensor or magnet.

3. A motorised valve according to claim 1, wherein the exit wheel is integral with the plug, and the exit wheel includes circumferential gear teeth.

4. A motorised valve according to claim 1, wherein the casing is formed by injection of a plastic material, the electric motor comprises a stator overmoulded by the plastic material, and all of the reduction gear train, the electric motor and the plug are located within the casing which is a single piece enclosed by a cover.

5. A motorised valve according to claim 1, wherein the casing includes a first housing positioning a printed circuit receiving electronics which are adapted to control the gear motor and a second housing positioning the reduction gear train, and a rotor of the electric motor is housed in the second housing and separated from a stator of the electric motor by an overmolding skin or a wall.

6. A motorised valve according to claim 1, wherein:
   the casing is extended by an electrical connector which outwardly projects from an opposite exterior side of the casing from the exit wheel and the valve;
   the exit wheel includes circumferential gear teeth; and
   the electrical connector is linearly aligned with the electric motor and the teeth of the exit wheel.

7. A motorised valve according to claim 1, wherein at least one of the intake or outlet ducts is integrally formed with the casing, and there are three or less separate fluid seals located within the body and the casing.

8. A motorised valve according to claim 1, wherein the valve is part of a purging circuit of a fuel vapour absorber.

9. A motorised valve comprising:
   a body with at least one intake duct and an outlet duct;
   a plug mounted movably in the body to plug or release a passage between the intake duct and the outlet duct;
   a motorised control system adapted to control movement of the plug;

the motorised control system comprising an electric motor and a reduction gear train;

the electric motor comprising a rotor and a stator;

the gear train comprising an exit wheel adapted to rotate the plug so as to allow progressive opening of the valve;

the valve being part of a purging circuit of a fuel vapour absorber;

a shaft coupling the plug to the exit wheel, and the plug being rotatable about a common axis with the exit wheel and the shaft; and a casing, the body being integrally formed with the casing without a mounting brace therebetween, said casing defining an inner space therein, the electric motor and the reduction gear train disposed in the inner space, the rotor and the stator of the electric motor being located along a plane which runs through the exit wheel, the plane being substantially perpendicular to the common axis.

10. A motorised valve according to claim 9, wherein the valve is a motor vehicle fuel vapour valve, and an external surface of the plug is spherical.

11. A motorised valve according to claim 9, further comprising seats contacting inner surfaces of the body adjacent the ducts, and contacting external surfaces of the plug to provide a seal between the plug and the body.

12. A motorised valve according to claim 9, further comprising motor control electronics located within a section of the casing separated from the reduction gear train by an overmolding skin or a wall therebetween, the stator being located in a section of the casing separated from the rotor by an overmolding skin or a wall therebetween, and the electronics and the stator being insulated from petrol vapours movable through the ducts.

13. A motorised valve comprising:

an electric motor including a rotor and a stator;

gears operably rotated by the rotor and including an exit gear rotatable about an axis with a shaft extending from the axis;

a one-piece casing comprising a first portion, to which is rigidly connected at least one intake duct and an outlet duct, and at least a second portion within which is located the electric motor and the gears;

a cover attached to the casing;

a curved valve plug located in a first part of the casing and being operably rotatable by the shaft, in response to energization of the electric motor, to plug or release a passage between the intake duct and the outlet duct;

the valve being part of a vehicular fuel system;

the valve only consuming power when movement of the plug is desired;

the valve only generating noise when the movement of the plug is desired;

the plug self-cleaning by scraping particles during the movement of the plug; and a position sensor providing diagnostic information regarding an opening position of the plug.

14. A motorized valve of claim 13, wherein at least one of the intake or outlet ducts is integrally formed with the casing, and there are three or less separate fluid seals located within the casing.

15. A motorised valve according to claim 13, further comprising:

an electrical connector integrally and outwardly projecting from an opposite exterior side of the casing from the exit gear and the valve plug;

the exit gear including circumferential gear teeth; and the electrical connector being linearly aligned with the electric motor and the teeth of the exit gear.

16. A motorised valve according to claim 13, further comprising motor control electronics being separated from the gears by an overmolding skin or a wall therebetween, the stator being separated from the rotor by an overmolding skin or a wall therebetween, and the electronics and the stator being insulated from petrol vapours movable through the ducts.

17. A motorised valve according to claim 13, wherein:

the vehicular fuel system includes a purging circuit of a fuel vapour absorber;

the shaft acts as a rotational bearing on a side of the exit gear adjacent the valve plug; and a lip seal integrally formed with the shaft isolates the electric motor from petrol vapours.

18. A motorised valve according to claim 13, wherein the rotor and the stator of the electric motor are located along a plane which runs through the exit gear, the valve plug is rotatable about the axis with the exit gear, and the shaft and the rotational axis are substantially perpendicular to the plane.

19. A motorised valve according to claim 13, wherein:

the ducts are coaxially aligned at the casing along a common duct centerline, the duct centerline extending through the valve plug; and fuel fluid operably flowing along the duct centerline, into one side of the valve plug and out of the opposite side of the valve plug when the valve plug is in its release position.

20. A motorised valve according to claim 13, wherein:

there are multiples of the stator offset to an internal electrical connector-end of the casing with the exit gear being on an opposite internal end of the casing;

the second portion of the casing and the cover are externally longer between the ends than an external thickness of the second portion of the casing and the cover; and a plane through the rotor, the stators and the exit gear is substantially perpendicular to the rotational axis of the exit gear.

* * * * *